UNITED STATES PATENT OFFICE.

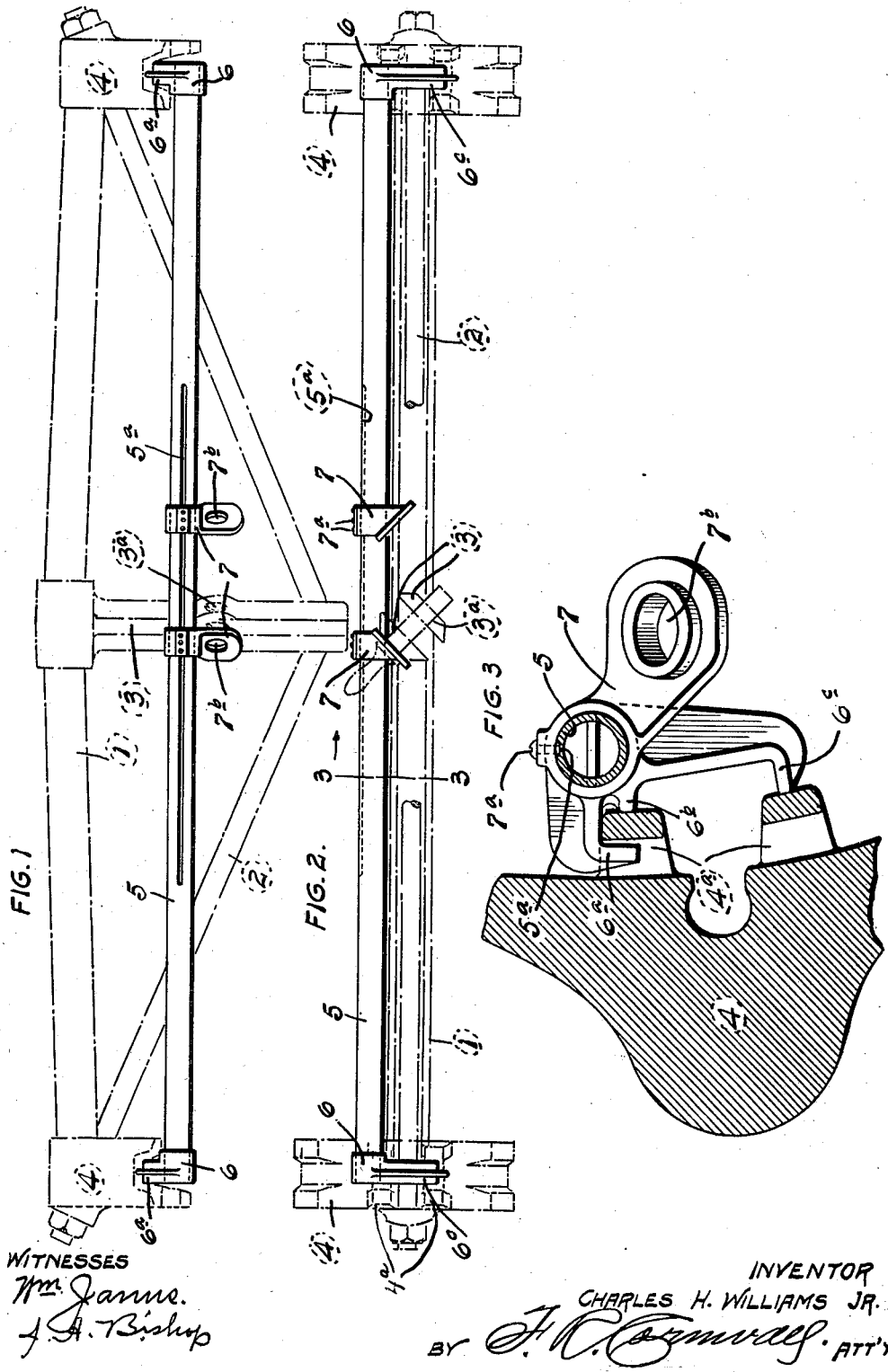

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

GAGE FOR BRAKE-BEAMS.

1,078,649.  Specification of Letters Patent.  Patented Nov. 18, 1913.

Application filed December 4, 1911. Serial No. 663,894.

*To all whom it may concern:*

Be it known that I, CHARLES H. WILLIAMS, Jr., a citizen of the United States, residing at Chicago, Illinois, have invented a certain new and useful Improvement in Gages for Brake-Beams, of which the following is a full, clear, and exact description, such as will enable others skilled in the art to which it appertains to make and use the same, reference being had to the accompanying drawings, forming part of this specification, in which—

Figure 1 is a top plan view of my improved gage for brake beams showing the same in position on a brake beam, the latter being shown in dotted lines. Fig. 2 is a front elevational view of the same. Fig. 3 is a view partly in section on line 3—3 of Fig. 2 and showing the right hand brake head in section.

This invention relates to a new and useful improvement in gages for brake beams, the object being to provide a gage of the character described which will enable the manufacturers of brake beams, and others, to determine whether or not the several dimensions of the beam are up to specified requirements.

By the use of my improved gage, I am able to gage the following dimensions of both right and left hand brake-beams; the distance between the centers of the brake heads; the size of the shoe-key openings in the brake heads; the thickness of the walls of the key lugs; the proper alinement of the brake heads; the relation of the faces of the heads to the horizontal plane of the strut; the central position of the strut, both with respect to the heads, and the compression and tension members; the angularity of the face of the strut where the brake lever passes through; the proper position of the pin hole; the size of the pin hole; and the interrelation of all of the above mentioned parts to one another.

All of the above dimensions have heretofore,—if checked at all—been checked separately, whereas my improved gage permits of all of the above features being checked at one operation and at the same time insures their proper relation to one another.

In the drawings I have indicated in dotted lines a brake beam of well known construction in which 1 indicates the compression member, 2 the tension member, 3 the strut, which, in practice, is slotted for the passage of a brake lever, which brake lever is intended to lie at an angle of 40 degrees, being held in position in the slot of the strut by a pin, shown in dotted lines in Fig. 2, which passes through the pin hole $3^a$; and 4, brake heads on the ends of the beam whose faces are provided with shoe key lugs $4^a$ through which the shoe-key, not shown, passes to secure the brake shoe, also not shown, in position.

My improved gage comprises a rod 5 on the ends of which are head pieces 6, these head pieces having over-hanging hook shaped projections $6^a$ which are intended to be received by the openings in the shoe-key lugs and thereby gage the size of said openings and also the distance between the centers of the brake heads. These head pieces are also provided with projections $6^b$ which rest against the outer faces of the upper shoe-key lugs of the brake head where they coöperate with the projections $6^a$ to determine the thickness of the outer wall of the shoe-key lugs. The head pieces are also provided with downwardly extending projections terminating in contact points $6^c$ which are intended to rest against the outer faces of the lower shoe-key lugs and in this manner, and by coöperating with the contacts $6^b$, determine whether or not the brake heads are in proper alinement.

Any space between any one of the four contact points $6^b$ and $6^c$ and the shoe key lug with which it is designed to coöperate indicates that the brake heads have been twisted out of alinement and require adjustment.

The central portion of the rod is preferably provided with a longitudinally disposed groove $5^a$ in which is received the end of a screw $7^a$ passing through the collar of a longitudinally movable angulated gage plate 7. This plate 7 is arranged at the proper angle to which the face of the strut should be set and is provided with an opening $7^b$ which should properly register with the pin hole in the strut when the strut is in correct position. There are preferably two of these angulated gage plates mounted on the rod in order that right and left-hand beams may be gaged by the same instrument.

The rod 5 is preferably marked at a point to which the gage plate 7 should be moved in its proper relation to the strut to determine the central position of the strut.

The angulation of plate 7 should correspond to the angulation of the strut and a test pin, in dotted lines in Fig. 2, is intended to be used by being passed through the opening 7ᵇ and into the pin hole of the strut to determine whether or not there is proper registration and whether the pin hole in the strut is of the proper size.

While I have shown my improved gage as designed for use in testing trussed brake beams, it is obvious that the principles here disclosed may be used in testing what are known as solid beams.

The Master Car Builders allow a certain variation or range between minimum and maximum limits for important dimensions in brake beams which range must not be exceeded. For instance: a range of one-quarter (1/4) of an inch is allowed in the length of the beam; a range of three thirty-seconds (3/32) of an inch is allowed in thickness of the wall of the key-slot lugs on the brake heads; and a range of one-sixteenth (1/16) of an inch is allowed in both directions in the location of the pin hole. If my improved gage did not provide for these variations and the lever pin hole was 1/64 of an inch out, it would be necessary to take another gage to ascertain how much the pin hole exceeded the maximum variation allowed. To provide for this, I make the opening 7ᵇ elongated: that is, preferably one-eighth (1/8) of an inch longer than its width, whereby, if the pin hole is out, but not exceeding the range of variation permitted, my gage will gage it.

What I claim is;

1. In a gage for brake beams, a supporting member, gage heads supported thereon, a gage plate on said supporting member intermediate said heads, said gage plate being provided with an aperture running obliquely to said supporting member, and a pin adapted to be inserted in said aperture.

2. A gage for brake beams comprising the combination of a supporting member, gage heads mounted thereon, each of said gage heads having a plurality of contact points disposed in a predetermined relationship, and a plate on said supporting member intermediate said gage heads, said plate being provided with an aperture running in a predetermined angular relationship to said supporting member, and a pin adapted to be inserted in said aperture.

3. In a gage for brake beams, a supporting member, gage heads supported thereon and spaced apart from each other, said gage heads having projections thereon provided with lateral gage faces, and adapted to engage in the shoe key lugs of brake heads and contact points on said heads spaced apart from said projections and adapted to engage the outer walls of the shoe key lugs.

4. A gage for brake beams comprising in combination a head provided with a hook member adapted to engage a key slot of a brake head, said hook member being provided with an inner gage surface disposed in a predetermined plane, said head being also provided with a contact surface disposed facing the plane of said inner gage surface and adapted to coöperate with the outer surface of the shoe-key lug engaged by the hook member, said head being further provided with a second contact surface disposed facing the plane of the inner gage face and adapted to coöperate with a second key lug, a second head similar to said head, said heads being disposed with their hook members extending in the same direction and means for supporting said heads apart from each other.

5. A gage for brake beams comprising a supporting member and gage heads supported by said supporting member apart from each other, each of said gage heads comprising a body portion having a lower contact point and an upper contact point, and a hook like projection adapted to coöperate with said upper contact point to engage a shoe key lug of a brake head to support the gage head in a fixed position thereon, the corresponding portions of the gage heads being alined with each other on lines parallel to the supporting member.

In testimony whereof I hereunto affix my signature in the presence of two witnesses, this 17th day of November, 1911.

CHARLES H. WILLIAMS, Jr.

Witnesses:
E. T. WALKER,
M. F. HUNTOON.

---

Copies of this patent may be obtained for five cents each, by addressing the "Commissioner of Patents, Washington, D. C."